(No Model.)
W. J. RANKINS.
GARDEN IMPLEMENT.
No. 348,774. Patented Sept. 7, 1886.
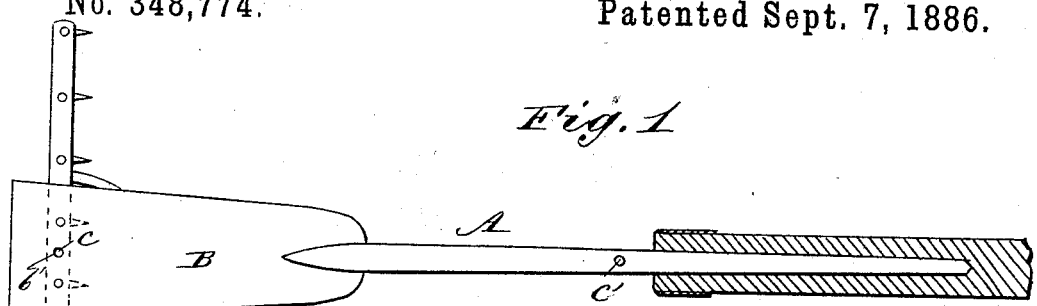
Fig. 1
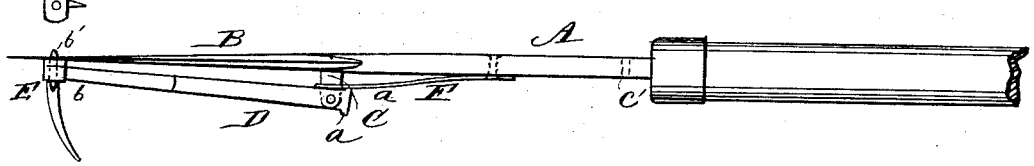
Fig. 2
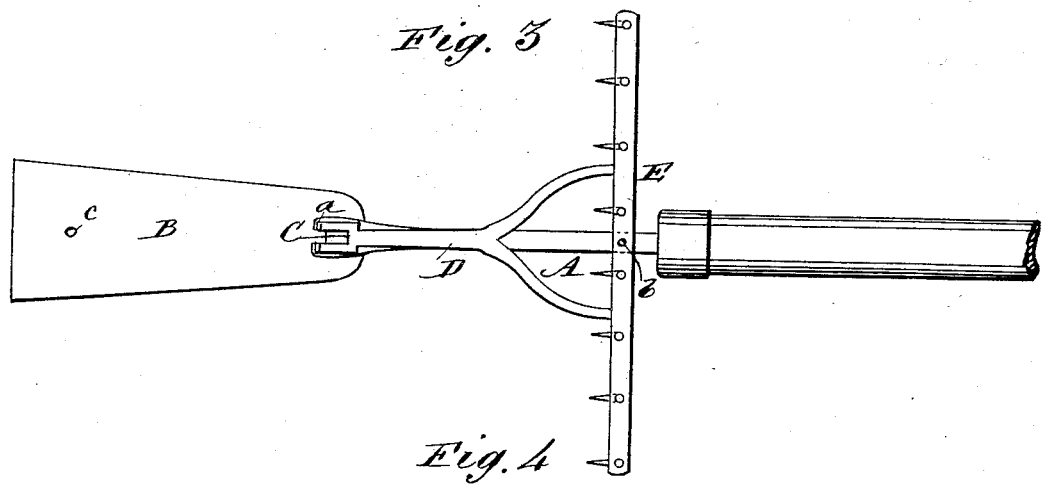
Fig. 3
Fig. 4
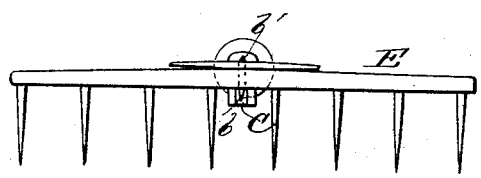
WITNESSES:
C. Neveux
C. Sedgwick
INVENTOR:
W. J. Rankins
BY Munn & Co.
ATTORNEYS.

UNITED STATES PATENT OFFICE.

WILLIAM J. RANKINS, OF AUGUSTA, KENTUCKY.

GARDEN IMPLEMENT.

SPECIFICATION forming part of Letters Patent No. 348,774, dated September 7, 1886.

Application filed July 8, 1886. Serial No. 207,467. (No model.)

*To all whom it may concern:*

Be it known that I, WILLIAM J. RANKINS, of Augusta, in the county of Bracken and State of Kentucky, have invented new and useful Improvements in Garden Implements, of which the following is a specification, reference being had to the annexed drawings forming a part thereof, in which—

Figure 1 is a plan view of my improved garden implement arranged as a rake. Fig. 2 is a side elevation. Fig. 3 is a plan view of the implement arranged for use as a spud. Fig. 4 is an end elevation.

Similar letters of reference indicate corresponding parts in the different figures of the drawings.

The object of my invention is to provide a simple and efficient implement for use in gardening operations, which may be arranged as a rake or adjusted for use as a spud.

My invention consists in a shank having formed thereon a spud, with an ear upon one side near the juncture of the blade and shank, and a rake having a short shank pivoted to the ear of the spud and arranged to be turned back against the handle of the implement when not in use, all as hereinafter more fully described.

Upon the shank A is formed the spud B of the usual shape and size, and an ear, C, projects from the side of the spud near the juncture of the shank A and the blade. To the ear C is pivoted the shank D of the rake E. The shank and rake-head are both preferably formed of iron or steel, and the end of the shank which is forked and pivoted on the ear C is provided with shoulders $a\ a$, which are pressed by a spring, F, secured to the shank A, and forked so as to embrace the ear C. The pressure of the spring F against one of the shoulders $a$ holds the rake in position for use, as shown in Figs. 1 and 2, and the pressure of the spring against the other shoulder holds the rake in a folded position, as shown in Fig. 3.

The rake-head is provided with dowel-pins $b\ b'$ projecting from opposite sides thereof, and the spud is provided with an aperture, $c$, for receiving the dowel $b'$ when the rake is in position for use. The shank A is provided with an aperture, $c'$, for receiving the dowel $b$ when the rake is folded back against the shank.

When the rake is unfolded, as shown in Figs. 1 and 2, it may be employed in the same manner as an ordinary rake, and when it is folded back against the shank, as shown in Fig. 3, it permits of the free use of the spud B.

My improved implement is especially useful for working among roots for loosening up the earth, also for exterminating dock, plantain, and other similar weeds.

Having thus described my invention, what I claim as new, and desire to secure by Letters Patent, is—

1. The combination, with the spud provided with a lateral ear, of a rake-head provided with the shank pivoted to the ear of the spud, and a spring for holding the rake in an open or folded position, substantially as shown and described.

2. As an improved article of manufacture, the spud B, having the aperture $c$, and provided with the apertured shank A and lateral ear C, the rake E, provided with dowels $b\ b'$, having the shank D and shoulders $a$, and the spring F, secured to the shank A of the spud, and arranged to hold the rake in an open or closed position, substantially as shown and described.

WILLIAM J. RANKINS.

Witnesses:
JOHN M. HARBESON,
F. W. ALLEN.